(12) United States Patent
Knapp

(10) Patent No.: US 6,471,132 B1
(45) Date of Patent: Oct. 29, 2002

(54) THERMOSTATIC MIXING DEVICE WITH ARRANGEMENT TO INCREASE MIXING

(75) Inventor: Francesco Knapp, Caba Manara (IT)

(73) Assignee: Masco Corporation of Indiana, Indianapolis, IN (US)

( * ) Notice: Subject to any disclaimer, the term of this patent is extended or adjusted under 35 U.S.C. 154(b) by 348 days.

(21) Appl. No.: 10/019,929
(22) PCT Filed: Jul. 6, 2000
(86) PCT No.: PCT/US00/18466
§ 371 (c)(1),
(2), (4) Date: Mar. 28, 2002
(87) PCT Pub. No.: WO01/02923
PCT Pub. Date: Jan. 11, 2001

(30) Foreign Application Priority Data

Jul. 6, 1999 (IT) .......................................... TO99A0581

(51) Int. Cl.⁷ .......................... G05D 23/13; G05D 23/12
(52) U.S. Cl. ..................................... 236/12.2; 236/12.22
(58) Field of Search .............................. 236/12.16, 12.2, 236/12.21, 12.22

(56) References Cited

U.S. PATENT DOCUMENTS

| | | | | |
|---|---|---|---|---|
| 3,388,861 A | * | 6/1968 | Harding | 236/12 |
| 3,827,016 A | * | 7/1974 | Knapp | 137/625.37 |
| 4,760,953 A | * | 8/1988 | Trubert | 137/607 |
| 5,356,074 A | * | 10/1994 | Limet et al. | 137/625.4 |
| 5,400,961 A | * | 3/1995 | Tsutsui et al. | 236/101 D |

* cited by examiner

Primary Examiner—William E. Tapolcai
(74) Attorney, Agent, or Firm—Kwadjo Adusei-Poku; Lloyd D. Doigan

(57) ABSTRACT

A thermostatic mixing valve includes a body, inlets for intake of hot and cold water and a discharge outlet for delivery of mixed water. A mixing chamber is within the body and is defined by a perimeter wall member that houses a slide valve which slidably moves in the mixing chamber so as to control the opening and closing of the inlets to the mixing chamber. A thermostatic element is mounted to control motion of the slide valve. A partition is mounted in the mixing chamber between the inlets. A cross passage allows water from one inlet to pass the partition toward the discharge outlet. The mixing chamber has an inclined surface to direct water from the other inlet toward the cross passage to promote mixing of the hot and cold water.

18 Claims, 3 Drawing Sheets

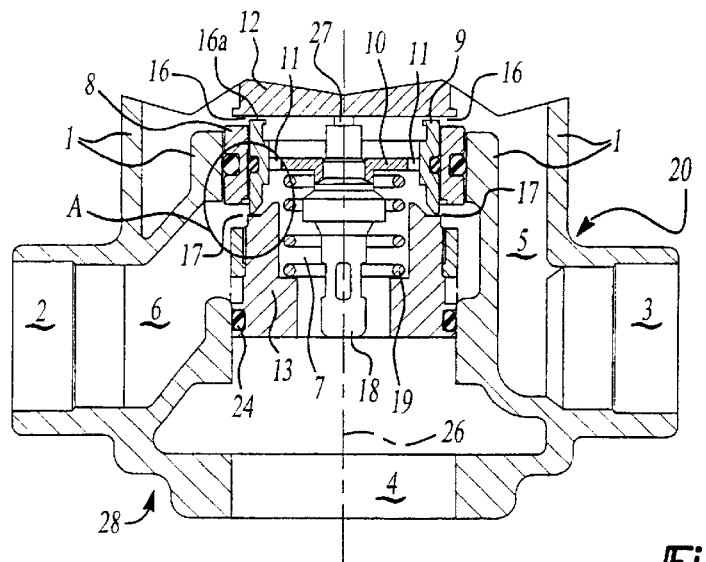
*Fig-1*
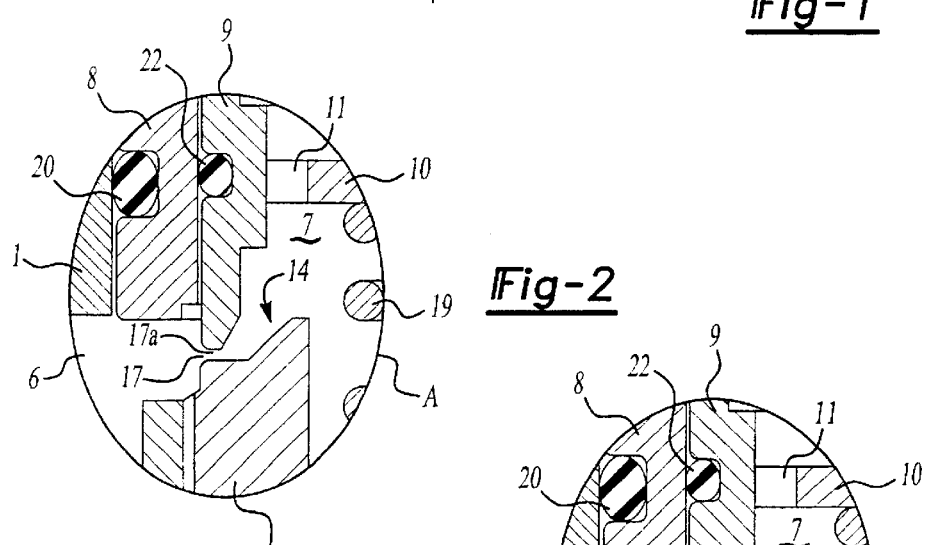
*Fig-2*
*Fig-3*
*Fig-4*

THERMOSTATIC MIXING DEVICE WITH ARRANGEMENT TO INCREASE MIXING

TECHNICAL FIELD

This invention relates to a thermostatic mixing valve and more particularly to a construction within a thermostatic valve that increases mixing of cold and hot water supplied to the mixing chamber.

BACKGROUND OF THE INVENTION

Hot water and cold water supplied to a thermostatic mixing valve must be efficiently mixed in order for a thermostatic mixing valve to optimally perform its thermostatic function. The water must be sufficiently mixed before it comes into contact with the thermostatic element which controls the operation of the thermostatic valve. Commonly the thermostatic element includes a wax filled case and a piston which is moved by thermal expansion of the contained wax. Consequently, in many better quality thermostatic mixing valves, structures are introduced to promote early and complete mixing of the cold water and hot water supplied to the mixing device before the mixed water comes into contact with the case.

German patent number 4,423,240 discloses a disc mounted on the thermostatic element. The disc periphery is located close to the hot water intake apertures located in the perimeter wall of the mixing chamber. The cold water enters the mixing chamber via a narrow space between the periphery of the disc and the perimeter wall of the mixing chamber. In this way, the two currents of cold water and hot water meet at right angles to each other to provide a certain level of mixing. However, this known construction has some disadvantages. First of all, an additional element in the form of a disc is introduced which increases the cost of manufacture and complicates assembly of the thermostatic mixing device. In addition, the disc needs to be positioned to form a narrow annular space within the mixing chamber adjacent the perimeter wall of the mixing chamber thereby calling for the necessity of precise manufacturing tolerances, especially with regards to the centering of the disc. Furthermore, the necessity for the space to be narrow in order to be effective undesirably reduces in the maximum flow rate provided by the mixing device. Finally, the pressure drop due to the passage of the cold water through the narrow space gives rise to a force which applies a dynamic drag to the disc. The dynamic drag acts against the biasing spring in the thermostatic system and interferes with its operation which may cause instability in some particular circumstances.

What is needed is a thermostatic mixing valve construction capable of effectively promoting early mixing of the cold water and the hot water supplied to a mixing device by a particular arrangement of existing elements without the addition of an added element. What is also needed is a construction that does not require overly precise manufacturing tolerances or does not appreciably increases the cost of production of a thermostatic mixing device. Another need is to reduce the phenomenon of dynamic dragging to the point where it becomes negligible in such a thermostatic valve and where the construction does not impose restrictive limits on the maximum flow rate admitted by the mixing valve.

SUMMARY OF THE INVENTION

In accordance with one aspect of the invention, a thermostatic mixing valve includes a housing with an inlet port for intake of hot water, an inlet port for intake of cold water and a mixing chamber located in the housing and defined by a perimeter wall. A discharge outlet for discharging mixed water leads from the mixing chamber. Preferably, passages leading to the mixing chamber are operably connected to the inlet ports for hot and cold water respectively. A slide valve is operably movable in relation to the perimeter wall of the mixing chamber and placed so as to control the opening and closing of at least one of the passages or ports for intake of hot water and cold water. A partition is affixedly connected to the slide valve. The partition has a crossing passage located in proximity to the partition's periphery. The housing contains a surface in proximity to the passage for intake of hot water that is inclined toward the interior of the mixing chamber and toward the partition and opposes the crossing passage in the partition.

A spring is located in the housing and connected to the valve to bias the slide valve in a direction corresponding to an opening of the passage for intake of hot water and to a closing of the passage for intake of cold water. A thermostatic element operating by thermal expansion is operably interposed between the partition and the housing to assist the slide valve to move in a direction corresponding to a closing of the passage for intake of hot water and to an opening of the passage for intake of cold water when the thermostatic element undergoes thermal expansion.

Preferably the slide valve is annular in shape and centered about a central axis of the valve with the passage for hot water and the passage for cold water being circumferentially arcuate about the central axis. It is also desirable that the partition has a plurality of crossing passages circumferentially spaced in proximity to the periphery of the partition. The inclined surface is also preferably annular in shape. In one embodiment, the inclined surface is substantially rectilinear in section and forming a frusto-conical surface. In another embodiment, the inclined surface is curvilinear in section and forms part of toroidal surface.

In one embodiment the housing includes a separate body member which houses the inlet ports. The mixing chamber is defined by the perimeter wall and a first insert member and second insert member. The passage for intake of cold water is located between the perimeter wall and the first insert member. The passage for intake of hot water is located between the perimeter wall and the second insert member. Alternatively, the perimeter wall can be integrally formed with the valve housing. The housing has a separate first insert member and a second insert member. The passage for intake of cold water is located at the perimeter wall in proximity to the first insert member and the passage for intake of hot water is located at the perimeter wall in proximity to the second insert member. The inclined surface is formed on the second insert member.

In another embodiment, the perimeter wall and the partition are formed in a separate member mounted in the body. The separate member and the first and second insert members are connected together to form a cartridge assembly which houses the thermostatic element and the spring.

In one embodiment, it is desirable that an inner facing peripheral surface of the second insert member is interposed between the inclined surface and the discharge outlet and is inclined in a direction away from the central axis as its distance from the partition increases.

In accordance with another aspect of the invention a thermostatic mixing valve includes a housing with an inlet for hot water, an inlet for cold water, and a mixing chamber in communication with said inlets. The thermostatically controlled slide valve is slidably mounted in the mixing chamber for controlling the extent of opening and closing of the inlets. The partition is located in the mixing chamber within the slide valve between the inlets. Crossing passages allow water from one inlet to pass the partition in the slide valve to the discharge outlet. The other inlet has a surface inclined to direct water entering therethrough toward the partition.

Because of the above described conditions, the cold water which enters the mixing valve and passes through the slidable valve is admitted to the mixing chamber via the peripheral passages of the partition, preferably in the form of several substantially parallel jets which are close to the perimeter wall of the mixing chamber. Hot water which enters the mixing valve and comes through the slide valve is admitted to the mixing chamber in contact with the inclined surface and consequently flows in a direction which is towards the interior and towards the partition. In this way the flow of hot water encounters the flow of cold water presenting an axial component of opposed velocities so that a high turbulence is generated which causes very effective mixing of the hot and cold flows before they come into contact with the thermostatic element.

This effect is obtained without introducing complexity by any additional elements or without causing any major problems in construction or assembly. Since the passages which cross the partition may be of any size, at least within certain limits, the arrangement does not cause any restriction in the maximum flow rate admitted by the thermostatic mixing valve. The cold water encounters less hindrance to its passage and does not undesirably provide any significant dynamic drag. The construction according to the invention does not entail any critical relative position of parts, and therefore does not entail the necessity of undesirably precise manufacturing tolerances.

Finally, the inner facing peripheral surface of the second insert member which may also be inclined as described, causes a cavitation which, in its turn, then increases the turbulence, which makes mixing more effective.

BRIEF DESCRIPTION OF THE DRAWINGS

Reference now is made to the accompanying drawings in which:

FIG. 1 is a fragmentary segmented view of a thermostatic mixing valve in accordance with one embodiment of the invention;

FIG. 2 is an enlarged view the portion of the thermostatic valve in the area denoted by the oval shown as A in FIG. 1;

FIG. 3 is a view similar to FIG. 2 illustrating an alternative embodiment of the invention;

FIG. 4 is a view similar to FIG. 2 illustrating another embodiment of the invention;

DETAILED DESCRIPTION OF THE PREFERRED EMBODIMENTS

Figure 5:
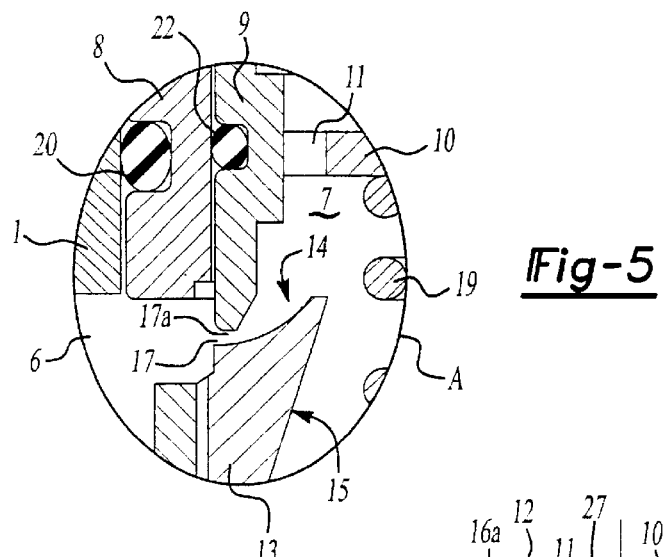
FIG. 5 is a view similar to FIG. 2 illustrating another embodiment of the invention.

Referring now to FIG. 1, a fragmentary view of a thermostatic mixing valve is shown incorporating one embodiment of the invention. The operating handle and safety components and components in the lower part to adapt which the thermostatic mixing valve to a faucet tap are not shown and form no part of the invention. The valve includes a body 1 with an inlet port 2 for intake of hot water, an inlet port 3 for intake of cold water, an outlet or discharge port 4 for delivery of mixed water at a regulated temperature. Connecting conduits 5 and 6 run from respective ports 2 and 3 to carry the hot water and water to a mixing chamber 7.

Figure 6:
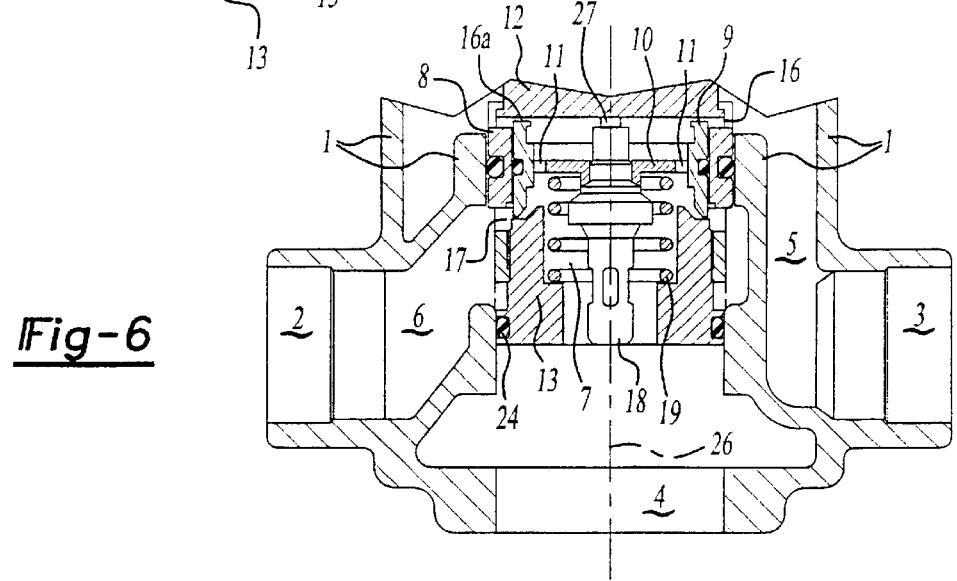
FIG. 6 is a view similar to FIG. 1 illustrating a cartridge format of the invention.
Figure 7:
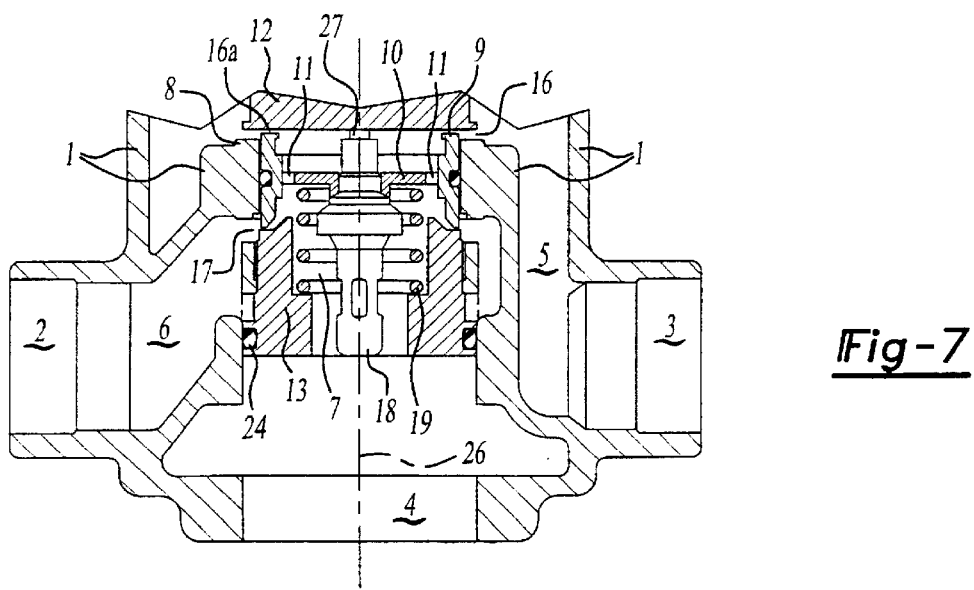
FIG. 7 is a view similar to FIG. 1 illustrating another embodiment of the invention.
Figure 8:
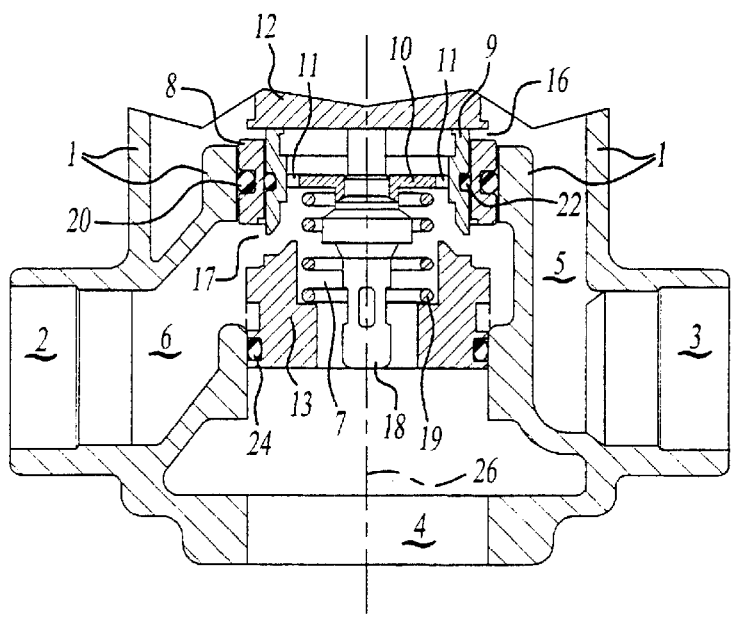
FIG. 8 is a view similar to FIG. 1 illustrating another modification.
Figure 9:
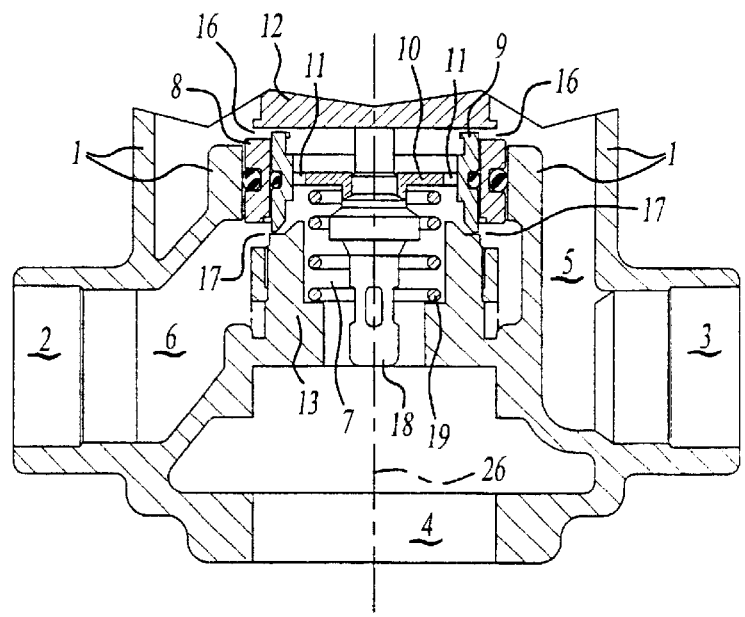
FIG. 9 is a view similar to FIG. 1 illustrating another embodiment of the invention.

The mixing chamber 7 is defined by a perimeter member wall 8 that can be annular in shape. The wall member 8 slideably seats a valve 9 that carries a partition 10. In addition, the thermostatic valve has a first stationary insert member 12 and a second stationary insert member 13. The insert members 12 and 13 have generally annular perimeters. In operating conditions, the stationary insert members 12 and 13 and the perimeter wall member 8 of the mixing chamber are statically secured together in body 1. One or more of the stationary insert members 12 and 13 can, if desired, be constructed integrally as one piece with the perimeter wall member 8 of the mixing chamber. FIG. 8 illustrates where insert 13 is formed integrally with wall member 8. Alternatively, one of the insert members may be integrally formed with body 1. FIG. 9 illustrates an embodiment where insert 13 is formed integrally with body 1. Conventional sealing devices 20, 22, 24 are placed between the various parts described in an already well known manner. The perimeter member wall 8 of the mixing chamber and the two stationary inserts 12 and 13 may be attached to each other firmly, so that they can be installed in or removed from body 1 as a cartridge unit as illustrated in FIG. 6. The outer shell of the cartridge may be formed by the wall 8, as in the forms of embodiment shown. Alternatively, the inserts 12 and 13 may also be mounted directly in body 1 where in this case the peripheral wall member 8 of the mixing chamber may be integrally formed with the body 1 itself as illustrated in FIG. 7. The body 1, installed insert members 12 and 13, and wall member 8 can be referred together as the housing 28.

Passages 16 are located between the first stationary component 12 and the perimeter wall member 8. The passages 16 allow the cold water to flow from connecting conduit 5 towards the interior of the mixing chamber 7. Passages 17 are located between the second stationary component 13 and the perimeter wall 8. The passages 17 allow the hot water to flow from connecting conduit 6 towards the interior of the mixing chamber 7. Passages 16 and 17 can be arcuate in shape circumferentially extending about the central axis 16. In one embodiment, passages 16 and 17 can be annular in shape completely surrounding central axis 26. The adjustable gaps 16a and 17a for the flow of water from passages 16 for the cold water and from passages 17 for the hot water are controlled in a manner already well-known by the sliding movement of the slide valve 9 axially between inserts 12 and 13 in response to various already well-known operating criteria for the thermostatic mixing valves.

A thermostatic element 18 of the type which operates by thermal expansion is mounted to partition 10 of the valve 9. Its moving element or piston 27 acts against the first stationary component 12 by means of safety elements and which can also be of any kind and are already well-known and not shown for simplicity of the drawing. The thermostatic element 18 extends into the mixing chamber 7 and then registers the temperature of the mixed water therein and expands or contracts correspondingly. The thermostatic element 18 expands due to an increase in the temperature of the mixed water which is in contact with it. The thermostatic element 18 causes the valve 9 secured with partition 10 to move in the direction which will reduce the clearance gap 17a for intake of hot water and increase the clearance of gap 16a for intake of cold water so as to hinder an increase in the temperature of the mixed water and consequently stabilized the temperature.

A spring 19, inserted between the second stationary component 13 and the partition 10 assists the valve 9 to move as the thermostatic element 18 contracts to carry out the opposite regulation to that described above when the temperature of the mixed water is decreasing. In other possible forms of embodiment, the spring 19 acts both on the partition of the valve and on any other part secured to the valve, for example, the thermostatic element 18 itself.

Crossing passages 11 are peripherally located in partition 10 of valve 9. Cold water from intake passages 16 must run through crossing passages 11 to reach the mixing chamber 7. The cold water therefore enters the mixing chamber in the form of many substantially parallel jets close to the perimeter wall member 8 in an axially directed velocity away from partition 10.

The stationary insert member 13 which defines the intake passages 17 for hot water has at least one internal surface 14 which is inclined towards the central axis 26 of the interior of the mixing chamber 7 and towards the partition 10. The flow of hot water which enter the mixing chamber 7 is directed by this inclined surface and therefore possesses a component of velocity directed radially towards the interior center axis 26 and a component of velocity directed axially towards the partition 10.

The flow of hot water directed in this way then encounters the flow of cold water entering from crossing passages 11, the velocity being directed axially in the opposite direction to the axial component of velocity of hot water. This encounter therefore gives rise to powerful turbulence and consequently to very efficient mixing which takes place in the peripheral area of the mixing chamber 7 before the mix of water comes into contact with the centrally located thermostatic element 18. The thorough mixture of water provides improved operation of the thermostatic mixing valve.

The part of the inclined surface 14 of the second stationary insert member 13 may be, in section, substantially rectilinear, as show in FIGS. 1, 2, and 4 such that the inclined surface forms part of a substantially frusto-conical surface. Alternatively, the inclined surface 14 of the second stationary component 13 may be, in section, curvilinear, as shown in FIGS. 3 and 5, so that the inclined surface forms part of a substantially toridal surface. But the surface 14 may also in fact have various other shapes provided that it includes an inclination towards the central axis 26 of the mixing chamber 7 and towards the partition 10.

FIGS. 4 and 5 show a structure for further intensifying the turbulence in the mixing area and thus the efficiency of mixing of hot water and cold water which is obtained. An internal peripheral wall 15 of the second stationary insert member 13 has an inclination in a direction which will present at every point an increase in the distance from the axis 26 to the device as the distance from the partition 10 increases. This arrangement causes a cavitation in the flow of mixed water which, after entering the mixing chamber 7, is directed towards the discharge outlet 4 with a consequent increase in the turbulence and the efficiency of the mixing. As has already been stated in relation to the inclined surface 14, the inclined surface 15 can also be substantially rectilinear in section, as shown in FIG. 4, or may be curvilinear or of another shape than that shown as long as the cross sectional area of the cavity increase as distance from 10 increases.

Other variations and modifications are possible without departing from the spirit and scope of the invention which is defined in the appended claims.

I claim:

1. A thermostatic mixing valve comprising a housing with an inlet port for intake of hot water, an inlet port for intake of cold water; a mixing chamber located in said housing and defined by a perimeter wall, a discharge outlet for discharging mixed water from said mixing chamber, a passage leading into said mixing chamber operably connected to said inlet port for hot water, a second passage leading into said mixing chamber operably connected to said inlet port for cold water, a slide valve slidably movable in relation to said perimeter wall of the mixing chamber and placed so as to control the opening and closing of at least one of said passages for intake of hot water and cold water, a partition which is affixedly connected to said slide valve, a spring located in the housing and connected to the valve to bias the slide valve in a direction corresponding to an opening of the passage for intake of hot water and to a closing of the passage for intake of cold water, and a thermostatic element operating by thermal expansion operably interposed between said partition and the housing to assist the slide valve to move in a direction corresponding to a closing of the passage for intake of hot water and to an opening of the passage for intake of cold water when said thermostatic element undergoes thermal expansion, the thermostatic mixing valve characterized by:

said partition having a crossing passage located in proximity to the periphery of the partition;

the housing contains a surface in proximity to the passage for intake of hot water that is inclined towards the interior of the mixing chamber and towards said partition, and the inner periphery of the surface being longitudinally aligned to be directly opposing the crossing passage in said partition.

2. A thermostatic mixing valve as defined in claim 1 further characterized by:

said slide valve being annular in shape about a central axis with said passage for hot water and said passage for cold water being circumferentially arcuate about said central axis;

said partition having a plurality of crossing passages circumferentially spaced in proximity to said periphery of said partition; and said inclined surface being annular in shape.

3. A thermostatic mixing valve comprising a housing with an inlet port for intake of hot water, an inlet port for intake of cold water, a mixing chamber located in said housing and defined by a perimeter wall, a discharge outlet for discharging mixed water from said mixing chamber, a passage leading into said mixing chamber operably connected to said inlet port for hot water, a second passage leading into said mixing chamber operably connected to said inlet port for cold water, a slide valve slidably movable in relation to said perimeter wall of the mixing chamber and placed so as to control the opening and closing of at least one of said passages for intake of hot water and cold water, a partition which is affixedly connected to said slide valve, a spring located in the housing and connected to the valve to bias the slide valve in a direction corresponding to an opening of the passage for intake of hot water and to a closing of the passage for intake of cold water, and a thermostatic element operating by thermal expansion operably interposed between said partition and the housing to assist the slide valve to move in a direction corresponding to a closing of the passage for intake of hot water and to an opening of the passage for intake of cold water when said thermostatic element undergoes thermal expansion, the thermostatic mixing valve characterized by:

said partition having a crossing passage located in proximity to the periphery of the partition:

the housing contains a surface in proximity to the passage for intake of hot water that is inclined towards the interior of the mixing chamber and towards said partition, and opposing the crossing passage in said partition:

said housing including a separate body member which houses said inlet ports;

said mixing chamber defined by said peripheral wall and a first insert member and second insert member;

said passage for intake of cold water being located between said peripheral wall and said first insert member and said passage for intake of hot water being located between said peripheral wall and said second insert member.

4. A thermostatic mixing valve as defined in claim 3 further characterized by:

said perimeter wall and said partition are formed in a separate member mounted in said body;

said separate member, and said first and second insert members are connected together to form a cartridge assembly which houses said thermostatic element and said spring.

5. A thermostatic mixing valve defined in claim 4 further characterized by:

said inclined surface being substantially rectilinear in section and forming a frusto-conical surface.

6. A thermostatic mixing valve defined in claim 3 further characterized by:

said inclined surface being substantially rectilinear in section and forming a frusto-conical surface.

7. A thermostatic mixing valve defined in claim 6 further characterized by:

an inner facing peripheral surface of the second insert member being interposed between said inclined surface and said outlet and being inclined in a direction away from said central axis as its distance from the partition increases.

8. A thermostatic mixing valve defined in claim 4 further characterized by:

said inclined surface is curvilinear in section and forms part of toroidal surface.

9. A thermostatic mixing valve defined in claim 3 further characterized by:

said inclined surface is curvilinear in section and forms part of toroidal surface.

10. A thermostatic mixing valve defined in claim 9 further characterized by:

an inner facing peripheral surface of the second insert member being interposed between said inclined surface and said outlet and being inclined in a direction away from said central axis as its distance from the partition increases.

11. A thermostatic mixing valve defined in claim 2 further characterized by:

said perimeter wall being integrally formed with said valve housing:

said housing having a separate first insert member and a separate second insert member;

said passage for intake of cold water being located at said peripheral wall in proximity to said first insert member, said passage for intake of hot water being located at said perimeter wall in proximity to said second insert member;

said inclined surface being formed on said second insert member.

12. A thermostatic mixing valve defined in claim 11 further characterized by:

said inclined surface being substantially rectilinear in section and forming a frusto conical surface.

13. A thermostatic mixing valve defined in claim 12 further characterized by:

an inner facing peripheral surface of the second insert member being interposed between said inclined surface and said outlet and being inclined in a direction away from said central axis as its distance from the partition increases.

14. A thermostatic mixing valve defined in claim 11 further characterized by:

said inclined surface is curvilinear in section and forms part of toroidal surface.

15. A thermostatic mixing valve defined in claim 14 further characterized by:

an inner facing peripheral surface of the second insert member being interposed between said inclined surface and said outlet and being inclined in a direction away from said central axis as its distance from the partition increases.

16. A thermostatic mixing valve including a housing with an inlet for hot water, a inlet for cold water, a mixing chamber in communication with said inlets; a thermostatically controlled slide valve slidably mounted in said mixing chamber for controlling the extent of opening and closing of the inlets; said thermostatic mixing valve characterized by;

a partition located in said mixing chamber within said slide valve between said inlets;

cross passages for allowing water from one inlet to pass said partition in said slide valve;

the other inlet having a surface inclined to direct water centering therethrough toward said partition an inner periphery of said surface being longitudinally aligned to be directly opposing said cross passages.

17. A thermostatic mixing valve as defined in claim 16 further characterized by:

said slide valve being annular in shape about a central axis with said passage for hot water and said passage for cold water being circumferentially arcuate about said central axis;

said partition having a plurality of crossing passages circumferentially spaced in proximity to said periphery of said partition; and said inclined surface being annular in shape.

18. A thermostatic mixing valve as defined in claim 16 further characterized by:

said partition being integrally formed with said slide valve;

said slide valve being annular in shape;

said cross passages opposing said inclined surface at said other inlet.

* * * * *